United States Patent [19]

Atkinson

[11] Patent Number: 5,511,122
[45] Date of Patent: Apr. 23, 1996

[54] INTERMEDIATE NETWORK AUTHENTICATION

[75] Inventor: Randall Atkinson, Annandale, Va.

[73] Assignee: The United States of America as represented by the Secretary of the Navy, Washington, D.C.

[21] Appl. No.: 254,087

[22] Filed: Jun. 3, 1994

[51] Int. Cl.$^6$ .................................................. H04K 1/00
[52] U.S. Cl. .............................. 380/25; 380/23; 380/21; 380/30
[58] Field of Search ............................. 380/23, 25, 30, 380/4, 49, 21

[56] References Cited

U.S. PATENT DOCUMENTS

| | | | |
|---|---|---|---|
| 4,438,824 | 3/1984 | Mueller-Schloer | 380/23 |
| 4,965,827 | 10/1990 | McDonald . | |
| 5,175,765 | 12/1992 | Perlman . | |
| 5,204,901 | 4/1993 | Hershey et al. . | |
| 5,204,961 | 4/1993 | Barlow . | |
| 5,241,599 | 8/1993 | Bellovin et al. . | |
| 5,280,583 | 1/1994 | Nakayama et al. | 395/200 |
| 5,371,794 | 12/1994 | Diffie et al. | 380/21 |
| 5,416,842 | 5/1995 | Aziz | 380/30 |

OTHER PUBLICATIONS

Tsudik, Gene, "*Datagram Authentication in Internet Gateways: Implications of Fragmentation and Dynamic Routing*", IEEE Journal on Selected Areas in Communications, vol. 7, No. 4, (May, 1989), IEEE, NY, NY.

ISI, Transmission Control Protocol, RFC-793 Network Information Center, (Sep., 1981).

Voydock, V. L. and Kent, S. T., "*Security in High–Level Network Protocols*", IEEE Communications, vol. 23, No. 7 (Jul., 1985).

Rivest, R. & Dusse, S., "*The MD5 Message–Digest Algorithm*," RFC–1321, DDN Network Information Center (Apr., 1992).

Cole, Raymond, Jr. et al., "*Multilevel Secure Mixed–Media Communication Networks,*" Proceedings of the 1989 IEEE Conference on Military Communications (MILCOM '89), IEEE, N.Y., N.Y.

Clark, D. D. and Wilson, "*A Comparison of Commercial and Military Computer Security Policies,*" Proceedings of the 1987 IEEE Symposium on Security & Privacy, IEEE Computer Society, Oakland, California (1987).

NBS, FIPS PUB 46, "*Data Encryption Standard (DES),*" National Bureau of Standards, U.S. Department of Commerce (Jan., 1977).

Schneier, B., "*Applied Cryptography,*" John Wiley & Sons, Inc., NY, NY (1994), p. 3.

Bellovin, Steven M., "Security Problems in the TCP/IP Protocol Suite" ACM, Computer Communications Review, vol. 19, No. 2 (Apr., 1989), pp. 32–48.

Bellovin, Steven M., "*Limitations of the Kerberos Authentication System*", Proceedings of the Winter 1991 Usenix Conference, Usenix Association, Berkley, CA (1991).

Kent, S. T. & Linn, J., Privacy Enhancement for Internet Electronic Mail: Part 11–Certificate–based Key Management, RFC–1114, DDN Network Information Center (Aug., 1989).

Kent, S. T. US DoD Security Options for the Internet Protocol, RFC–1108, DDN Network Information Cen

(List continued on next page.)

*Primary Examiner*—David C. Cain
*Attorney, Agent, or Firm*—Thomas E. McDonnell; Daniel Kalish

[57] ABSTRACT

An internetwork authentication method is provided for verifying a sending host by a receiving host or an intermediate router or gateway. The method comprises the steps of: obtaining a network address and a public key of a receiving host; utilizing the public key from the receiving host in combination with a private key of the originating host to generate a cryptographic signature; transmitting the signature along with data through a first subnetwork in at least one packet; receiving at least one packet at the receiving host; and the receiving host utilizing a private key of said receiving host site and a public key of said originating host to verify said cryptographic signature.

14 Claims, 4 Drawing Sheets

OTHER PUBLICATIONS ter (Nov., 1991).

Mockapetris, Paul, Domain Names–Implementation and Specification, RFC–1035, DDN Network Information Center (Nov., 1987).

Needham, R. M. and Schroeder, M. D., *"Using Encryption for Authentication in Large Networks of Computers"*, Communications of the ACM, vol. 21, No. 12 (Dec., 1978).

*"Security Requirements for Cryptographic Modules"*, Federal Information Processing Standards Publication 140–1, (Jan. 11, 1994), pp. 1–53.

Branstad, Dennis et al., *"SP4: A Transport Encapsulation Security Protocol"*, Proceedings of 1987 NCSC Conference, pp. 158–161.

Nelson, Ruth, *"SDNS Services and Architecture"*, Proceedings of 1987 NCSC Conference, pp. 153–157.

Lambert, Paul A., *"Layer Wars: Protect the Internet with Network Layer Security"*, Motorola, Inc., Secure Telecommunications.

Dinkel, Charles (Editor), *"Secure Data Network System (SDNS) Network, Transport, and Message Security Protocols"*. U.S. Dept. of Commerce, Nat'l. Inst. Stds., NISTIR 90–4250.

INTERMEDIATE NETWORK AUTHENTICATION

BACKGROUND OF THE INVENTION

The present invention relates generally to network security in a distributed network or between networks, and more particularly to an internetwork authentication method which is capable of intermediate authentication as well as authentication of fragmented data regardless of the network protocol.

Historically, most networking protocols and architectures have not included solid authentication or confidentiality mechanisms. The MIT Athena project has been the exception to this rule with its development of the Kerberos authentication system. This system is beginning to be implemented at some sites and some workstation manufacturers are considering implementing Kerberos in their standard OS releases, but the overwhelming majority of networked sites have no authentication or confidentiality mechanisms in their network architectures. The ISO (International Standards Organization) OSI (Open Standards Interconnection) suite provides for confidentiality services in the upper layers but does not require authentication of any of the lower layer protocols. These lower layer protocols have a number of security problems in protocols commonly used in the internet and have certain limitations intrinsic to the Kerberos protocols. The security issues in the ISO OSI suite appear to have gotten less attention than in the Internet suite because the Internet suite is more widely implemented at present.

Recently, the Internet Engineering Task Force has begun to incorporate authentication and confidentiality mechanisms in some protocols, notably the Simple Network Management Protocol (referred to as "SNMP") and Privacy Enhanced Mail. A few other recent protocol specifications, such as for the Border Gateway Protocol (referred to as "BGP") and Open Shortest Path First (referred to as "OSPF") routing protocols provide hooks for authentication to be added later but do not define or mandate any real authentication mechanism. The BGP version 3 specification explicitly states that the definition of authentication mechanisms other than the default "no authentication" option are out of the scope of the specification. Similarly, the OSPF version 2 specification asserts that "OSPF also provides for the authentication of routing updates, . . . " when in fact the only authentication mechanisms specified are "no authentication" or "cleartext password." Overall, there is no fundamental systemic security architecture in the Internet protocol suite at present.

Bellovin, in his article entitled "Security Problems in the TCP/IP Protocol Suite" ACM Computer Communications Review, Vol. 19, No. 2 (April 1989), pp. 32–48 identifies that there are security flaws in the TCP/IP (Transmission Control Protocol/Internet Protocol) protocol suite because hosts rely on IP source address for authentication and also because routing protocols have minimal to no authentication. The Bellovin article is incorporated herein by reference. Similarly, the ISO protocol has not paid sufficient attention to building security mechanisms into the network, transport, or routing protocols.

Some proposed computer security policies, such as Clark-Wilson, are not practical to implement using current network protocols, which rely on datagram fragmentation, unless intermediate authentication is provided. For a discussion of such policies, see D. D. Clark and D. R. Wilson, "A Comparison of Commercial and Military Computer Security Policies," Proceedings of the 1987 IEEE Symposium on Security & Privacy, IEEE Computer Society, Oakland, Calif. (1987), which is incorporated herein by reference.

Aside from concerns about attacks, there is recently much interest in implementing policy-based routing, network usage accounting, and network auditing. None of these may be dependably implemented unless the network protocol headers may be authenticated by routers as well as the end hosts. If there is no intermediate authentication, then it is straight forward to spoof policy-based routing and to cause others to pay for one's network traffic. Without authentication, auditing cannot yield meaningful results. It is clear that network protocol header authentication is essential for both existing and future services.

Thus, there is a need for providing intermediate authentication in networking. By being able to authenticate a packet while in route, the possibility of host masquerading and network attacks are reduced. Additionally, policy-based routing, network usage accounting, and network auditing may be implemented.

SUMMARY OF THE INVENTION

It is therefore an object of the present invention to provide an authentication method which will provide for both intermediate authentication as well as host to host authentication in a datagram network that permits fragmentation of datagrams.

It is a further object to provide an accurate method for determining the network traffic generated by a particular host.

It is yet another object to provide a means for accurately billing a host for its use of network traffic and facilities.

It is yet another object to provide for detection of a non-valid host on a network.

It is yet another object to improve network reliability as well as network security.

It is yet another object to provide support for network auditing, network traffic counting, and policy based routing.

In all of the above embodiments, it is an object to provide an authentication system which utilizes an asymmetric key system in the authentication system.

It is still another object of the invention to provide an authentication system in which the first packet or datagram fragment is dynamically routed while all succeeding packet fragments or datagram fragments then follow the established path of the first packet fragment or datagram fragment.

According to one broad aspect of the present invention, there is provided a method for network authentication comprising the steps of: obtaining a network address and a public key for a receiving host; utilizing the public key from the receiving host in combination with a private key from the sending host to generate a cryptographic signature; transmitting the signature along with data through a first subnetwork in at least one packet; receiving at least one packet at the receiving host; and the receiving host utilizing a private key for said receiving host site and a public key for said sending host to verify said cryptographic signature.

According to another broad aspect of the invention, there is provided a method for network authentication of fragmented packets comprising the steps of: requesting a network address for a receiving host from a subnetwork name system; utilizing a private key from a sending host to generate a cryptographic signature; transmitting the signature along with data to a first subnetwork in at least one packet, having a first packet size which is different from that of the transmitting host and thereby fragmenting the original packet into at least two packet fragments, the packet fragments having a first packet fragment which is transmitted to a first available intermediate gateway or router in the first subnetwork, and each subsequent fragment of that first packet fragment following the progress of the first packet fragment through the first subnetwork in a train-like fashion; reassembling the fragmented packets at an intermediate gateway or router; performing a verification of the cryptographic signature on the reassembled packet; retransmitting the fragmented packets through the first subnetwork; receiving at least one packet at the receiving host; and utilizing a public key for the sending host to verify the cryptographic signature.

By being able to provide both host to host authentication as well as intermediate authentication, the possibilities of host masquerading and network attacks are reduced or eliminated. Additionally, policy-based routing, network usage accounting, and network auditing may be implemented.

Other objects and features of the present invention will be apparent from the following detailed description of the preferred embodiment.

BRIEF DESCRIPTION OF THE DRAWINGS

The invention will be further described in conjunction with the accompanying drawings, in which.

DETAILED DESCRIPTION OF THE PREFERRED EMBODIMENT

Figure 1:
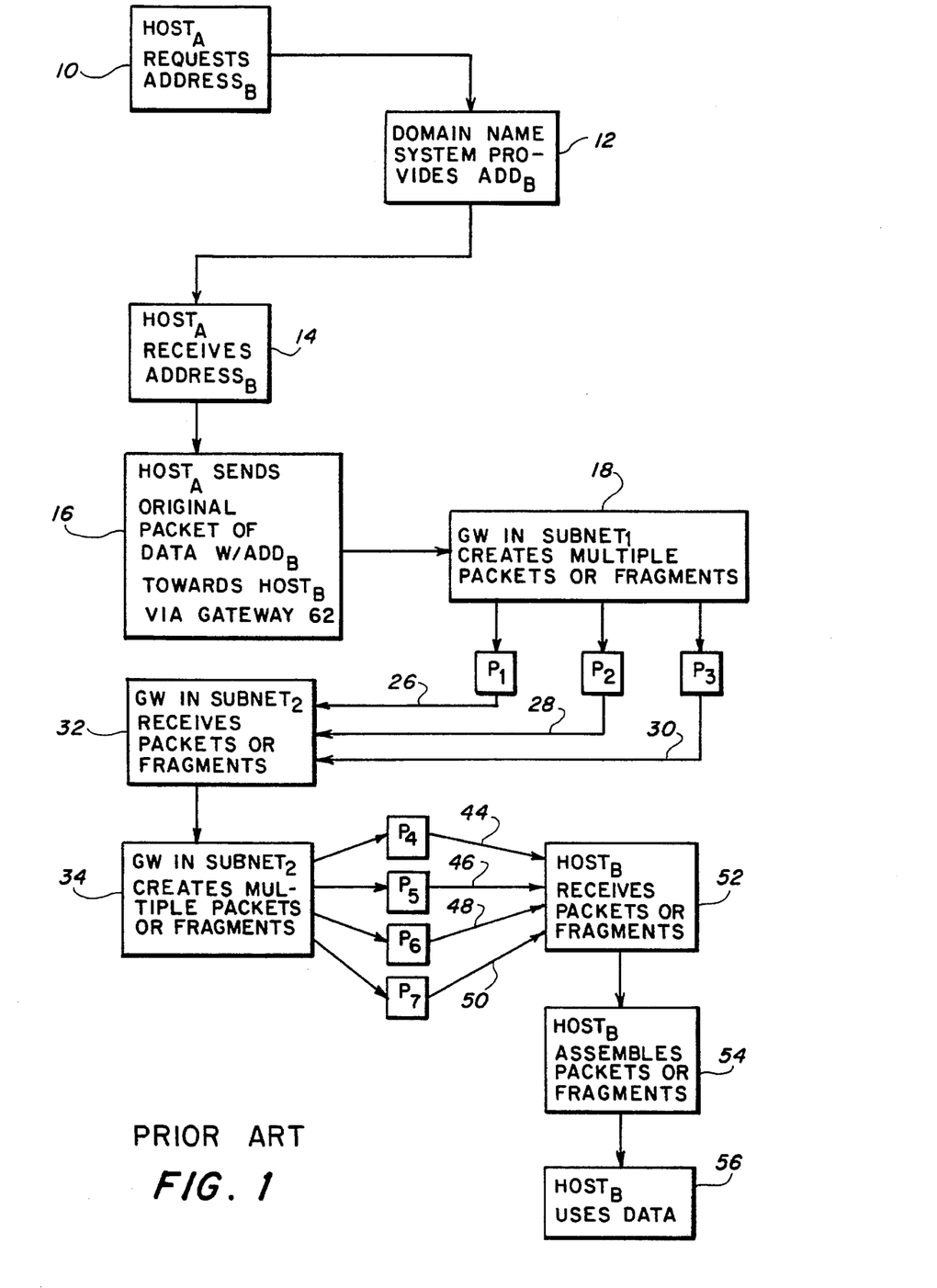
FIG. 1 is a flow chart illustrating a method utilized in a typical or prior art communications transaction between $host_A$ and $host_B$ in which no authentication is conducted in a network which may employ fragmentation of datagrams.
Figure 2:
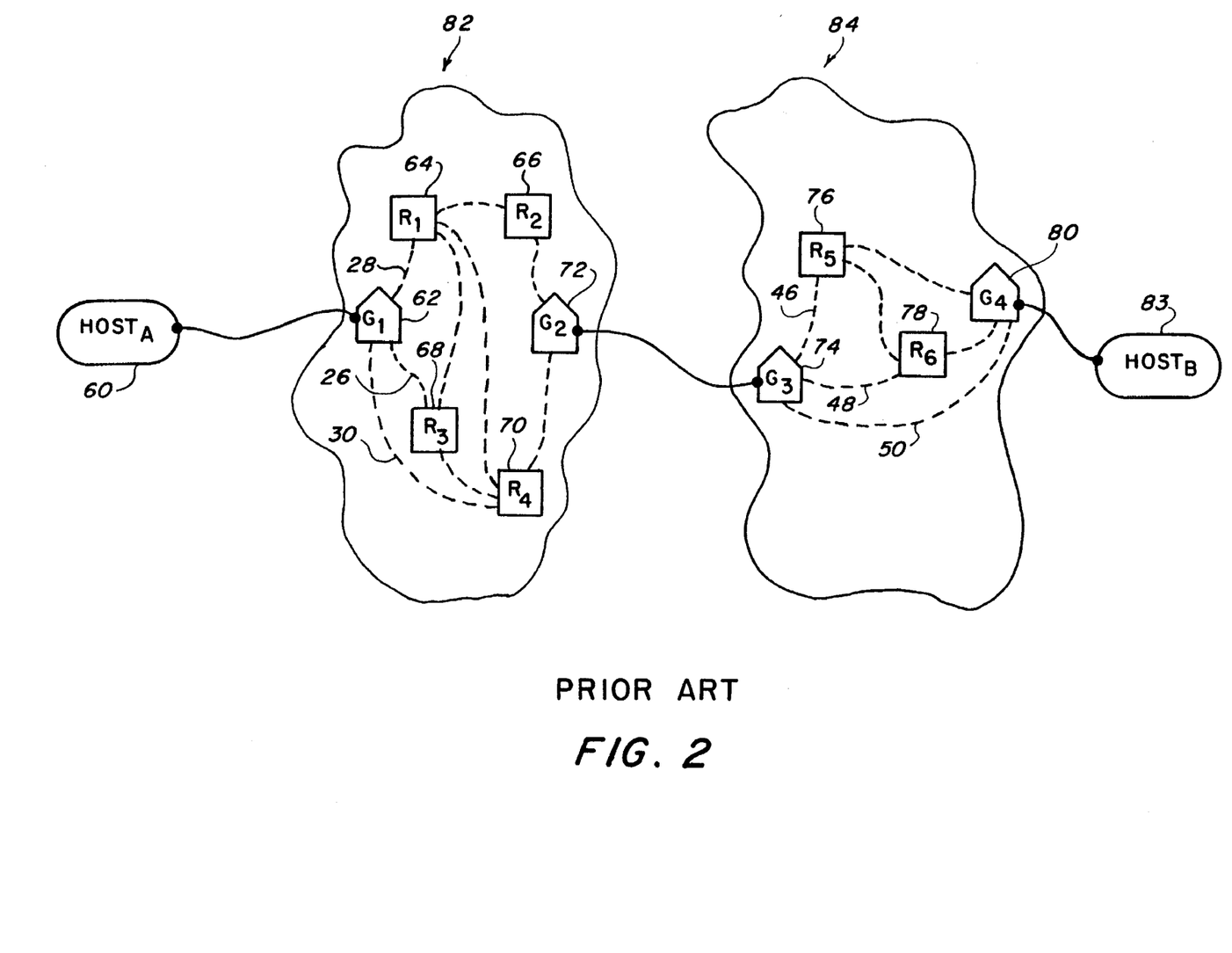
FIG. 2 is an exemplary network topography of communications between $host_A$ and $host_B$ according to the prior art.

With reference to the Figures, wherein like reference characters indicate like elements throughout the several views and, in particular, with reference to FIGS. 1 and 2, a generic method of host to host communication is illustrated. In order to appreciate the improvements associated with the invention disclosed herein, a detailed description of the prior approach to network communication is essential.

In prior network communication applications, a host, generically referred to as $host_A$ or element 60 will wish to communicate with a $host_B$ or element 83. $Host_A$ 60 may be in the same subnetwork or network as $host_B$ 83 or may be in a different subnetwork or network. Network$_1$ 82 is the network containing $host_A$ 60 and network$_2$ 84 is the network containing $host_B$ 83. FIGS. 1 and 2 illustrate the condition where $host_A$ 60 and $host_B$ 83 are in different subnetworks. When $host_A$ 60 wishes to communicate with $host_B$ 83, $host_A$ 60 will obtain the address and key of $host_B$ 83 from a network name system via the networks or from a configuration table at $host_A$ 60. This request is illustrated by box 10 in FIG. 1. The network name system will provide the network address of $host_B$ 83 to $host_A$ 60 as illustrated by box 12. Next, the network address is received by $host_A$ 60, see box 14. After receiving the address, $host_A$ 60 begins to transmit datagrams or packets towards $host_B$ 83 via a gateway 62, see box 16. The physical communication protocol being used between $host_A$ 60 and subnetwork$_1$ 82 will vary with the particular type of host and network. The above described method is one of several well known methods for obtaining the network address of a host.

Subnetwork$_1$ 82, as illustrated by box 18, will then process data into packets which are link or subnetwork specific. A standard protocol which is utilized is the IP. In this protocol, datagrams or packets are formed from the data stream. Packets generally comprise a header section, a data section and a trailer section. The specific relationship between these sections or the existence of these sections are protocol specific and thus will not be discussed in any detail. The data may be fragmented by the creation of packets for subnetwork$_1$ 82 and thereby take different routes through subnetwork$_1$ 82 towards $host_B$ 83. For illustrative purposes, three packets or fragmented packets, $P_1$, $P_2$ and $P_3$ are illustrated. These packets are transmitted through subnetwork$_1$ 82 by a conventional transmission method. Each packet or fragment may take a different route through the subnetwork as illustrated by lines 26, 28 and 30 which correspond to the routes of packets $P_1$, $P_2$ and $P_3$, respectively. Thus, each packet may go through a different intermediate router 64, 66, 68 or 70 as illustrated in FIG. 2.

U.S. Pat. No. 5,175,765 to Perlman is exemplary of the drawbacks of the prior art. Perlman discloses an authentication system which utilizes an asymmetric key system to authenticate a data packet. This system utilizes a robust broadcasting technique and therefore is not capable of performing intermediate fragmentation or intermediate authentication for the reasons discussed above. Both of these capabilities are important for proper network usage accounting.

Eventually, packets $P_1$, $P_2$ and $P_3$ will migrate through subnetwork$_1$ 82 along the dashed lines in FIG. 2. In a configuration not shown, if $host_B$ 83 were located within subnetwork$_1$ 82, $host_B$ 83 would receive the packets and reassemble them to gain access to the data contained therein. $Host_B$ 83 would utilize this data and will assume that the sender, $host_A$ 60, is the actual sender of the data. Thus, there would not be any end to end or intermediate authentication of the host or data. In this situation, the data would be fragmented only one time, i.e., during the creation of packets $P_1$, $P_2$ and $P_3$.

In the configuration shown in FIG. 2, $host_B$ 83 is located in a different subnetwork$_1$ 84 than subnetwork$_1$ 82. Packets $P_1$, $P_2$ and $P_3$ will be transmitted from gateway 72 of subnetwork$_1$ 82 to gateway 74 of subnetwork$_2$ 84. This step is illustrated in FIG. 1 as block 32. The link/subnetwork protocols utilized in subnetwork$_1$ 82 may differ from those of subnetwork$_2$ 84. In this situation, subnetwork$_2$ 84 will create additional packets $P_4$, $P_5$, $P_6$ and $P_7$, see block 34. Four packets have been used for illustrative purposes only but any number of packets may be generated by subnetwork$_2$ 84. Since the link or subnetwork protocols of subnetwork$_1$ 82 and subnetwork$_2$ 84 may be different, the size of the packets may also be different. Thus, the original data, header and trailer information of each packet in subnetwork$_1$ 82 may now appear in different packets in subnetwork$_2$ 84, i.e., the information from packet $P_1$ may now be contained between packets $P_4$ and $P_5$. Thus, the data has been fragmented for a second time. Packets $P_4$, $P_5$, $P_6$ and $P_7$ are transmitted through the intermediate routers 76 and 78 of subnetwork$_2$ 84 along the dashed lines of subnetwork$_2$ 84 and in a similar fashion to that of subnetwork$_1$ 82 above. There may be any number of intermediate routers and those used in FIG. 2 are for illustrative purposes only. Lines 44, 46, 48 and 50 illustrate the transmission concept in FIG. 1.

In such a technique, the ability to authenticate packets at an intermediate gateway or router, such as router 76, is completely lost since each packet fragment may take a different route through subnetwork$_2$ 84. Additionally, since the information contained in packet $P_1$ may be split between packets $P_4$ and $P_5$, it is impossible to assemble the information of packet $P_1$ at an intermediate gateway or router. In this situation, the original data is fragmented two times, i.e., once when packets $P_1$, $P_2$ and $P_3$ are created and once when packets $P_4$, $P_5$, $P_6$ and $P_7$ are created.

Eventually, packets $P_4$, $P_5$, $P_6$ and $P_7$ will migrate through subnetwork$_2$ 84 along the dashed lines in FIG. 2. Host$_B$ 83 will receive the packets and reassemble them to gain access to the data contained therein, see blocks 52 through 56. Host$_B$ 83 will utilize this data and will assume that the sender, host$_A$ 60, is the actual sender of the data. Thus, there is no end to end or intermediate authentication of the host or data.

Several U.S. Patents have touched on the subject of authentication. For example, U.S. Pat. No. 4,965,827 to McDonald discloses an authentication algorithm for verifying that a message has not been corrupted or changed during transmission. This method utilizes a symmetric cryptographic hash function which is only used for the authentication of the data. In a symmetric key system, the same key is used for encryption and decryption and does not provide the protection of an asymmetric key system. The McDonald system provides no means for authenticating that a particular host has actually sent the data. Thus, a host may masquerade as a valid host and send invalid data over the network. Additionally, network applications including intermediate authentication are not described by the McDonald patent. As another example of a U.S. Patent discussing authentication, U.S. Pat. No. 5,241,599 to Bellovin et al., discloses a key management protocol which could be used over a network which is not secure.

Figure 3:
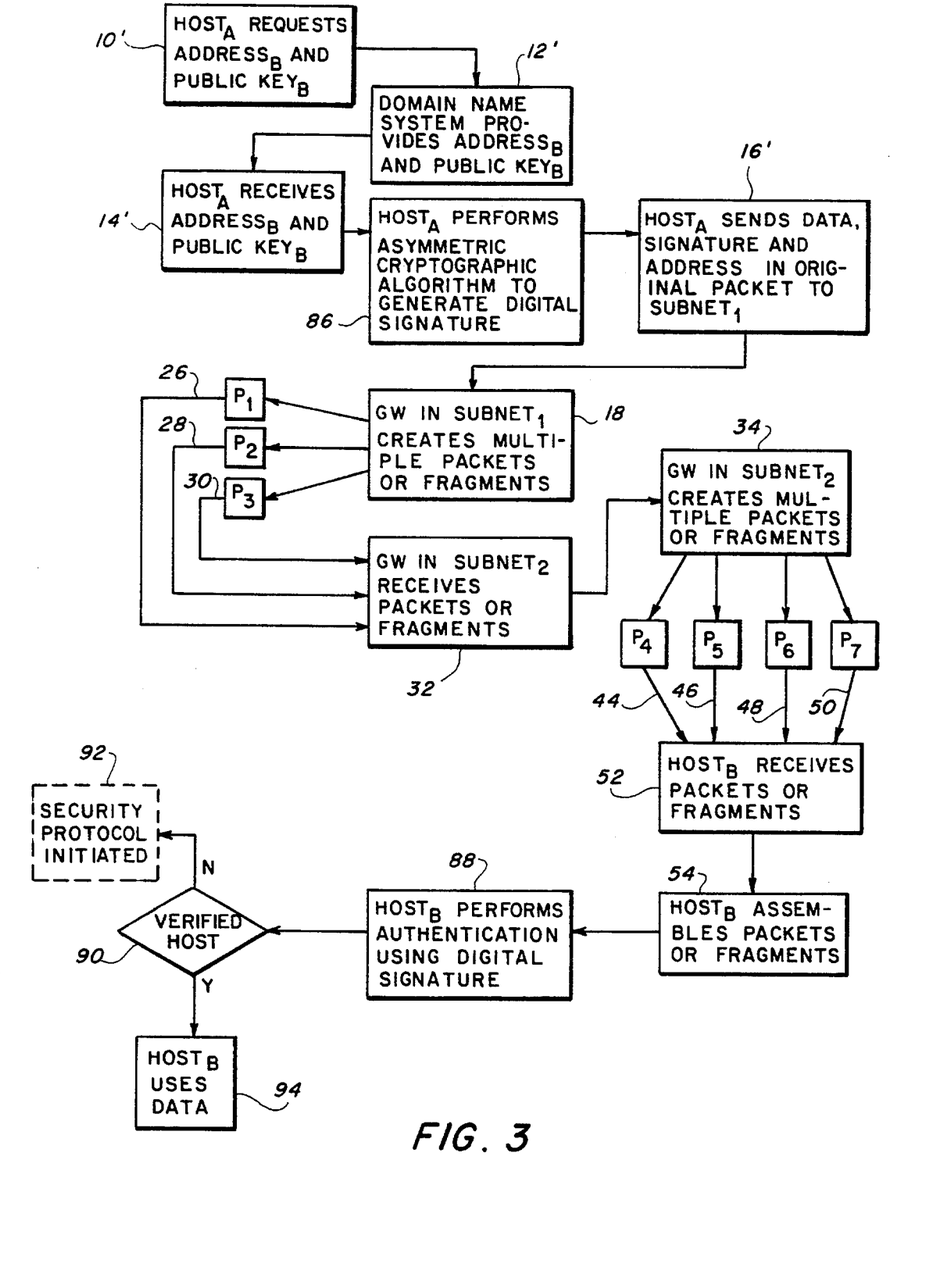
FIG. 3 is a flow chart illustrating a first preferred communications transaction between $host_A$ and $host_B$ in which end to end authentication is conducted in a network which may employ fragmentation of datagrams.
Figure 4:
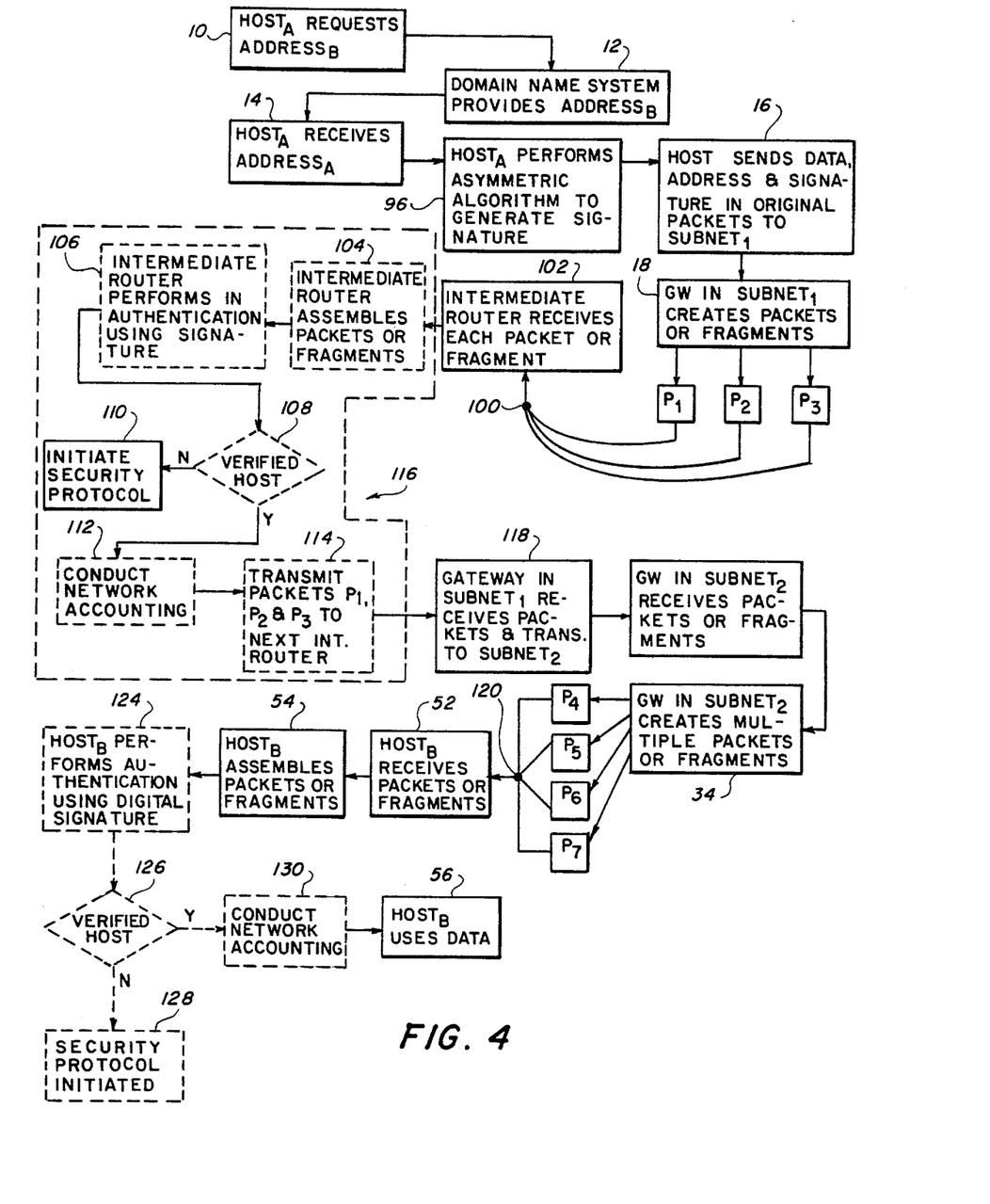
FIG. 4 is a flow chart illustrating a second preferred communications transaction between $host_A$ and $host_B$ in which both intermediate and end to end authentication may be conducted in a network which may employ fragmentation of datagrams.

The above description provides a basic understanding of how data is transferred between host$_A$ 60 and host$_B$ 83. Now we will turn to a new method of host authentication as illustrated in FIGS. 3 and 4. FIG. 3 illustrates a host to host authentication method and FIG. 4 illustrates a host to intermediate gateway or router authentication method. Like reference numerals have been utilized where there is no significant difference between the invention and the prior art. Primes above the reference numerals have been utilized where the elements are similar to the prior art but have additional features or modifications. Finally, new reference numerals are provided for new steps which are conducted.

Cryptographic Method

Before a description of the new methods are provided, it is necessary to describe current cryptographic mechanisms. Cryptographic mechanisms provide the greatest assurance of the authenticity of data. Cryptographic systems come in two varieties, symmetric key and asymmetric key. See, B. Schneier, "Applied Cryptography," John Wiley & Sons, Inc., New York, N.Y. (1994), p.3, which is incorporated herein by reference. In a symmetric key system, the same key is used for encryption and decryption. When providing confidentiality using an asymmetric system, each party has two keys, one public and one private, and data is usually encrypted using the sender's private key and the recipients public key. When providing authentication using an asymmetric system, the data and the keys are used to generate a digital signature. That signature is verified by the recipient using the data received and the appropriate decryption keys.

Host to Host Authentication

Turning now to FIG. 3, the steps involved in a new method of host authentication are illustrated. A host, generically refereed to as host$_A$ or element 60 will wish to communicate with a host$_B$ or element 83. Host$_B$ 83 may be in the same subnetwork or network 82 as host$_A$ 60 or may be in a different subnetwork or network 84. FIGS. 1 and 2 illustrate the condition where host$_A$ 60 and host$_B$ 83 are in different subnetworks, 82 and 84, respectively. When host$_A$ 60 wishes to communicate with host$_B$ 83, host$_A$ 60 will request the address and public key of host$_B$ 83 from a subnetwork name system. This request is illustrated by box 10' in FIG. 3. The public key request is important in this new method and its importance will be discussed in detail below.

Subnetwork Name System

It is possible to distribute the public keys to all hosts and users of the internetwork, see Mockapetris, Paul, Domain Names—Implementation and Specification, RFC-1035, DDN Network Information Center (November, 1987) which is hereby incorporated by reference. Public keys for hosts are included in the nameservice database and all nameservice responses are authenticated. This means that all of host public keys are distributed in an authenticated manner. Name service requests need not be authenticated or confidential in the general case. However, if the visibility of some data in the nameservice database is to be controlled, then authenticated confidential requests would be required to access non-published data and authenticated confidential responses to such requests would also be required. The public keys for the root nameservers should be made readily available, such as by telephone and postal mail, so that system administrators may have confidence in the authenticity of the root public key. Otherwise, if the correct root public key were not widely known, an intruder would be easily able to masquerade as the legitimate nameserver.

Because the user and application level keys are distributed using mechanisms implemented in the local host, those keys may be changed easily by the user without much concern for the key change being delayed in propagation to all of the directory or network name service providers. Host keys are less easily changed, but such changes should be regularly scheduled in order to limit damage from compromised keys.

Modifications To Current Protocol

This section described additions and changes to the Internet Protocol suite to enable its use to distribute asymmetric keys and to enable its responses to be authenticated.

A new TYPE field is added to the resource records in the Domain Name System. This new field contains a signed asymmetric host authentication key to be used by hosts attempting to authenticate network packets. Each host which transmits any authenticated frames must have this record in the Domain Name System (referred to as "DNS") and the value of the record must be correctly advertised. The proposed name of this new DNS record type is HAK. The value of the HAK is represented as hexadecimal numbers using the digits 0 through 9 and letters A through F. The HAK record's value is the authentication key certificate used for that host that the HAK record is associated with. No HAK records may exist that are not associated with a specific host.

All Subnetwork Name System responses from nameservers provide authentication. All Subnetwork Name System requests should provide authentication. Hosts receiving an unauthenticated response should take note of the lack of authentication and may ignore unauthenticated responses if required by the security policy applicable to the subnetwork of the receiving host or take appropriate action. Hosts receiving a response containing incorrect authentication data should discard the response without processing it further.

To provide user asymmetric keys for encryption or authentication, it is suggested that a new service, the Key Information Protocol or KIP, be provided. This service would accept requests for user public keys and would respond only if such information were available. The "no key exists for that user" and "that user not valid here" cases would both cause an "invalid request" to be sent back to the requestor. All responses would use IP authentication. The Key Information Protocol would also use the host's public authentication key in the KIP response to enable the recipient to authenticate the response. KIP should provide for separate authentication and confidentiality keys. Depending on perceived need, KIP could even be extended to use a Needham & Schroeder-like mechanism to set up and use symmetric keys for some session with the two KIPs handling the key set up securely (each on behalf of its local user) See, Needham, R. M. and Schroeder, M. D., "Using Encryption for Authentication in Large Networks of Computers", Communications of the ACM, Vol. 21, No. 12 (December 1978), pages 993–999, which is incorporated herein by reference. The use of the Needham & Schroeder-type symmetric key mechanism is less desirable than using asymmetric key technology because of the increased complexity.

When the KIP concept is implemented, a new Domain Name System record should be added that would point to the name of the host providing KIP service for a host or subnetwork.

Turning back to the steps in the host to host authentication method illustrated in FIG. 3, the subnetwork name system will provide either the name of the nameserver for the subnetwork containing the desired host or the public key and address of the desired host. All responses would be authenticated using the public key of the nameserver and any unauthentic responses would be discarded and ignored. It might be valuable to audit all unauthentic responses. This process would be repeated as necessary until the requesting host received an authentic response containing the public key and address of the desired other host. If the locally trusted nameserver uses caching of data, response time would be reasonable despite having authentication. Using local nameservers and caching is a good implementation strategy for nameservice regardless of whether authentication is used. This process of the subnetwork name server getting and sending the address and public key is illustrated by box 12'.

As shown in box 14', the network address and public key information is next received by host$_A$ 60. At this point, host$_A$ 60 uses an asymmetric cryptographic algorithm to generate a digital signature, see box 86. As discussed further below, the public key of host$_B$ 83 is used in combination with the private key of host$_A$ 60 to generate a digital signature.

Asymmetric Algorithm

An asymmetric algorithm is utilized to generate a digital signature. This may be accomplished in several ways. The first method is to utilize a well known asymmetric algorithm such as RSA. See, U.S. Pat. No. 4,405,829 to R. L. Rivest, A. Shamir and L. M. Adleman, which is incorporated herein by reference. A second method is to encrypt the output of a symmetric cryptographic hash function using an asymmetric encryption algorithm. A third method is to use a keyed asymmetric cryptographic hash algorithm. The above three methods have been utilized in the past to provide end-to-end application-layer authentication but have not been used to provide intermediate network authentication. There is a significant difference between authenticating the accuracy of transmitted data, i.e. application-layer authentication, and network-layer authentication, the subject matter of this application. For convenience, the output of the asymmetric algorithm will be referred to as a digital signature.

Confidentiality and authentication might also be built into applications above the transport layer or into the transport layer itself. In some cases, it might be desirable to also use mechanisms built into the upper layer protocol that are independent of these network-layer mechanisms. For example, the Secure SNMP specifications build authentication and optional confidentiality mechanisms into the SNMP applications. This approach has the advantage that a security breach at a higher layer does not necessarily compromise the security at the network layer. However, security above the network layer does not provide authentication or confidentiality to all network users or applications and is not a general approach. For examples of transport-layer protocols, see ISI, Transport Control Protocol, RFC-793 Network Information Center (September, 1981) and ISI, OSI Transport Protocol Specification, IS-8073, ISO (1986), both of which are hereby incorporated by reference.

The next question is what will the asymmetric algorithm be used on, i.e., the data, the header information or the entire network protocol frame. It makes more sense to authenticate the entire network protocol frame than the header data alone. The incremental cost of authenticating the entire frame instead of just the headers is not significant and the increased entropy and size of the authenticated information makes many cryptanalytic attacks on the authentication harder, while also ensuring the authenticity of the data. Bellovin, in "Security Problems in the TCP/IP Protocol Suite" (supra) described a number of attacks at the transport layer, such as using TCP sequence number prediction to masquerade as another host's connection. Even trustworthy hosts need to isolate user connections from one another and to ensure that no user is capable of masquerading as another user via networking mechanisms. The ability to provide circuit-oriented confidentiality mechanisms is also desirable. Neither TCP nor OSI transport protocol currently provides either authentication or confidentiality mechanisms, which is the area of this disclosure, although the U.S. Government has published a standard called SP4 that adds security to TCP and an ISO OSI Transport Protocol.

While it is possible to support transport authentication using entirely different mechanisms than those used to provide network authentication, it is desirable to devise a common approach to authentication so that the overhead of implementation is minimized and so that the different services integrate together nicely. Moreover, there is a potential for decreased size in the trusted code required to implement the authentication services. It is usually easier to verify the correctness and trustworthiness of smaller amounts of code than larger amounts of code.

Turning back to the steps in the host to host authentication method illustrated in FIG. 3, after performing the asymmetric encryption, $host_A$ 60 begins to transmit data, address and the digital signature to $subnetwork_1$ 82 via a gateway 62, see box 16'. The link/subnetwork communication protocol being used between $host_A$ 60 and $subnetwork_1$ 82 may vary with the particular type of host and network and thus, the location of the signature may vary.

$Subnetwork_1$ 82, as illustrated by box 18, will then process data into packets or fragments which are network or subnetwork specific. For illustrative purposes, three packets or, $P_1$, $P_2$ and $P_3$ are illustrated. Packets generally comprise a header section, a data section and a trailer section. The specific relationship between these sections or the existence of these sections are protocol specific and thus will not be discussed in any detail. The location of the signature may be in any of the above identified packet sections. These packets are transmitted through $subnetwork_1$ 82 by a conventional transmission method. The packets may also be routed as will be discussed in relation to the intermediate authentication method, below. Each packet or fragment may take a different route through the network as illustrated by lines 26, 28 and 30 which correspond to the routes of packets $P_1$, $P_2$ and $P_3$, respectively. Thus, each packet may go through a different intermediate router 64, 66, 68 or 70 as illustrated in FIG. 2.

An intermediate router is any device which routes packets between any two communication devices. A gateway is an intermediate router which connects two subnetworks. Therefore, the terms may be used interchangeably throughout the detailed description.

Eventually, packets $P_1$, $P_2$ and $P_3$ will migrate through $subnetwork_1$ 82 along the dashed lines in FIG. 2. In an architecture not shown, in which $host_B$ 83 is located within $subnetwork_1$ 82, then $host_B$ 83 will receive the packets or fragments and reassemble them to gain access to the data and signature contained therein. $Host_B$ 83 will utilize a corresponding asymmetric algorithm to decode or verify the signature and thereby verify the authenticity of $host_A$ 60. This is accomplished by utilizing the public key of $host_A$ 60 in combination with the private key of $host_B$ 83, see the discussion on encryption above.

If $host_B$ 83 is located in another subnetwork 84, as illustrated in FIG. 2, then packets $P_1$, $P_2$ and $P_3$ will be transmitted from gateway 72 of $subnetwork_1$ 82 to gateway 74 of $subnetwork_2$ 84. This step is illustrated in FIG. 3 as block 32. The link/subnetwork protocols utilized in $subnetwork_1$ 82 may differ from that of $subnetwork_2$ 84. In this situation, $subnetwork_2$ 84 will create additional packets or fragments $P_4$, $P_5$, $P_6$ and $P_7$, see block 34. Four packets have been used for illustrative purposes only and any number of packets may be generated by $subnetwork_2$ 84. Since the protocols of $subnetwork_1$ 82 and $subnetwork_2$ 84 may be different, the size of the packets may also be different. Thus, the original signature, data, header and trailer information of each packet in $subnetwork_1$ 82 may now appear in different packets in $subnetwork_2$ 84, i.e., the information from packet $P_1$ may now be contained between packets $P_4$ and $P_5$. As stated above, packets $P_4$, $P_5$, $P_6$ and $P_7$ are transmitted through the intermediate routers 76 and 78 of $subnetwork_2$ 84 along the dashed lines of $subnetwork_2$ 84 and in a similar fashion to that of $subnetwork_1$ 82 above. Optionally, the packets may be transmitted in a manner similar to that explained for the intermediate authentication method below. There may be any number of intermediate routers and links between routers and those used in FIG. 2 are for illustrative purposes only. Lines 44, 46, 48 and 50 illustrate the general transmission concept in FIG. 3.

The ability to authenticate packets at an intermediate gateway or router, such as router 76, is not a concern in a host to host authentication method.

Eventually, packets $P_4$, $P_5$, $P_6$ and $P_7$ will migrate through $subnetwork_2$ 84 along the dashed lines in FIG. 2. $Host_B$ 83 will receive the packets and reassemble them to gain access to the signature data contained therein, see blocks 52 and 54. $Host_B$ 83 will utilize a corresponding asymmetric algorithm to decode or verify the signature and thereby verify the authenticity of $host_A$, see block 88. This is accomplished by utilizing the public key of $host_A$ 60 in combination with the private key of $host_B$ 83, see the discussion on cryptographic algorithms above. If $host_A$ is authentic, then the data will be utilized by $host_B$ 83. Otherwise, a security protocol may be initiated to notify a network official of a potential security problem, see block 92.

Intermediate Authentication

Turning now to FIG. 4, a method for intermediate authentication is illustrated. This method is very similar to that of the host to host authentication as described above. Therefore, only the differences between the two methods will be discussed in detail.

In order to permit any intermediate network gateway or router to authenticate the contents of the network frame, the public key for each host is published and the private key is kept private by that host. The sending $host_A$ 60 uses its public encryption key plus the data to generate a cryptographic signature which is embedded in the packet, see block 96. In this method, the public key of $host_B$ 83 is not requested or utilized in any manner.

Network frames are frequently fragmented into smaller frames that will fit within the size limitation of the protocols in and underneath the link or subnetwork layer. Thus, the original frames may be fragmented, i.e. packets $P_1$, $P_2$ and $P_3$ may be different in size than the ones originally transmitted by $host_A$ 60 to $subnetwork_1$ 82. In most cases currently, reassembly only occurs at the destination node and has drawbacks with respect to performance degradation associated with packet fragment reassembly. Intermediate nodes, such as routers or gateways, need not pay the reassembly cost unless they wish to perform intermediate authentication. Note that the original network packets may still be routed independently and dynamically and thus this new technique is still very flexible. When the packets migrate from one subnetwork to another, the packets may be reassembled into the original packets and then be transmitted as the original packets, thereby avoiding additional fragmentation and allowing for dynamic routing of the original packets in the current subnetwork.

These packet fragments are introduced to $subnetwork_1$ 82 as described above. The fragments are transmitted through $subnetwork_1$ 82 in a very different manner. The first fragment of each original packet to be transmitted is sent to the first available intermediate router in a conventional fashion. Each subsequent fragment of the original packet will then follow the same route as the first fragment through $subnetwork_1$ 82. This method is significantly different than the transmission scheme which is utilized in the prior art. Thus, the packet fragments form a train through $subnetwork_1$ 82 as illustrated in FIG. 4 by point 98 and line 100. Each original packet is routed conventionally unless the original packet is fragmented. In the case when the packet is fragmented, each packet fragment will traverse the same route as its first fragment.

At this stage, the intermediate router may decide to authenticate the packet fragment information. The decision on when and how often to authenticate will be a policy decision and will vary between subnetworks. If the intermediate router does perform authentication, then the intermediate router will assemble the packet fragments $P_1$, $P_2$ and $P_3$, see dashed box 104. This step is necessary since the original packets have been fragmented, i.e. packets $P_1$, $P_2$ and $P_3$ are different in size than the ones originally transmitted by $host_A$ 60 to $subnetwork_1$ 82. Then the intermediate router reads the reassembled packet to determine the sender's identity and attempts to confirm that the claimed sender's published public key produces the correct results when applied to the embedded digital signature, see dashed boxes 106 and 108. If there is a correct result from the asynchronous algorithm, then the sender and the data are authentic. Otherwise, the sender or some part of the data is not authentic. This permits policy-based routing and usage-based accounting to be dependably implemented as illustrated in dashed box 112. Finally, the intermediate router transmits the reassembled packet to the next router or gateway, possibly refragmenting the packet if necessary, see dashed box 114. The above process may be repeated by each intermediate router or gateway and is illustrated by dashed block 116. Note that the reassembled packets may still be routed independently and dynamically and so the new technique retains flexibility.

The packet fragments are eventually received by $subnetwork_2$ 84 as described above. As stated previously, there may be a second fragmentation problem which may occur when packets $P_4$, $P_5$, $P_6$ and $P_7$ are formed. One must have the entire original network frame intact in order to attempt to authenticate it. Network frames are frequently fragmented into smaller frames that will fit within the size limitation of the protocols in and underneath the link or subnetwork layer as illustrated by packets $P_4$, $P_5$, $P_6$ and $P_7$. This means that at each point where a router or gateway wishes to attempt to authenticate the network packet, it must reassemble all of the components of the original network packet first. It also means that if any intermediate router or gateway does not reassemble the original frame before resending or resending different fragments of a given network packet over different routes, that intermediate routers or gateways downstream from that gateway or router will be unable to authenticate the fragmented network packets.

In most cases currently, reassembly only occurs at the destination node. Intermediate nodes, such as routers or gateways, do not currently pay this cost. Reassembly and potential subsequent refragmentation will impair software performance when the link and physical protocols carry very small amounts of data in each lower level frame. This imposition may be reduced by utilizing appropriate hardware. Commercially available routers commonly have such hardware.

Any gateway or router in $subnetwork_2$ 84 is capable of intermediate authentication by executing the steps illustrated in dashed block 116.

Eventually, packets $P_4$, $P_5$, $P_6$ and $P_7$ will migrate through $subnetwork_2$ 84 along the dashed lines in FIG. 2. $Host_B$ 83 will receive the packets and reassemble them to gain access to the signature data contained therein, see blocks 52 and 54. $Host_B$ 83 will utilize a corresponding asymmetric algorithm to decode or verify the signature and thereby verify the authenticity of $host_A$, see block 124. This is accomplished by utilizing the public key of $host_A$ 60, see the discussion on encryption above. If $host_A$ is authentic, then network accounting will take place and the data will be utilized by $host_B$ 83, see blocks 130 and 56. Otherwise, a security protocol may be initiated to notify a network official of a potential security problem, see block 128.

Proposed Protocol Modifications

This section describes proposed changes to protocols to utilize the above described method. For example, 3 authentication modes are illustrated in FIGS. 1, 3 and 4. Other authentication modes are possible with this scheme. One is the degenerate case of no authentication and two actually provide some authentication. The existence of the no authentication case permits hosts or networks not interested in the offered security properties to go without them and not have to pay for what they do not seek to use. The first real authentication mode suggested would use the MD5 digital signature algorithm applied across the header of the network-layer frame and then encoded using previously agreed upon DES encryption key using the chained block mode of DES. See, Rivest, R. & Dusse, S., "The MD5 Message-Digest Algorithm," RFC-1321, DDN Network Information Center (April, 1992); NBS, FIPS PUB 46, "Data Encryption Standard (DES)," National Bureau of Standards, U.S. Department of Commerce (January, 1977). The second real authentication mode would use the MD5 digest algorithm having been applied across the entire network-layer frame (exclusive of the authentication information field) and then have that encoded using RSA encryption.

Additional Benefits

Another critical service that needs authentication is the network name service. If an intruder may masquerade as the legitimate nameservice provider, he may cause denial-of-service attacks, may modify data in transit, and may make other attacks on users of the internetwork. If however, the nameservice were authenticated, these attacks would not be possible.

Additionally, this authentication architecture could be used to implement the Clark-Wilson commercial security policy over a network or internetwork. To support Clark-Wilson, authentication of users real identities is essential. In the approach suggested here, the hosts would be authenticated to each other and could provide user authentication keys or such keys could be placed in a central directory service with its responses being authenticated. Full protection from host masquerading and network traffic control policies could be easily enforced. Since the Clark-Wilson policy is more concerned with integrity than confidentiality, this might be sufficient for a commercial firm or educational institution. Confidentiality could easily be added at the transport layer or above if it were needed and need not degrade performance for applications or users that didn't need it.

With a few extensions the approach outlined here could also support a multi-level security policy using either a "pink architecture" or a "red/black architecture". "Pink architecture" and "red/black architecture" are described in Cole, Raymond, Jr. et al , "Multilevel Secure Mixed-Media Communication Networks," Proceedings of the 1989 IEEE Conference on Military Communications (MILCOM '89), IEEE, New York, N.Y. For example, there might be encryption of user data immediately above the transport layer or the transport layer itself might be encrypted. Either asymmetric or symmetric keys could be used, though use of the latter would complicate key management. Because the network layer is fully authenticated, the receiving host may be confident of where the transmission originated. Also, vulnerability to certain kinds of denial or service attacks may be significantly reduced by precluding the attacks described earlier. Use of the link encryption below the network layer to minimize the effectiveness of traffic analysis remains feasible and is unaffected by network layer or higher mechanisms such as these.

It appears feasible to implement the required changes to the existing protocols in a way that would retain interoperability with older versions. Moreover, this architecture scales nicely to large internetworks such as the current Internet. There are a number of hardware implementations of DES available already and it is feasible to implement digital signature algorithms and asymmetric key cryptography in hardware as well. If these were integrated into a chipset, the cost of authentication would be minimized. Moreover, hosts that do not wish to use authentication do not have to. Only the root nameservers and hosts wishing to use authentication services need pay for its implementation costs and overhead.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A method for authenticating an originating host at a receiving host, said method comprising the steps of:
    (a) obtaining a network address and a public key of said receiving host;
    (b) utilizing said public key from said receiving host in combination with a private key from said sending host to generate a cryptographic signature;
    (c) transmitting said cryptographic signature along with data through a first subnetwork in at least one packet;
    (d) receiving said at least one packet at said receiving host; and
    (e) said receiving host utilizing a private key of said receiving host and a public key of said originating host to verify said cryptographic signature.

2. The method recited in claim 1 wherein an asymmetric algorithm is used to generate said cryptographic signature.

3. The method recited in claim 2 wherein said asymmetric algorithm is an RSA digital signature algorithm.

4. A method for authentication of an originating host at a receiving host site and one or more intermediate routers, said method comprising the steps of:
    (a) obtaining a network address for said receiving host;
    (b) utilizing a private key from said originating host to generate a cryptographic signature;
    (c) transmitting said cryptographic signature along with data through a first subnetwork in at least one packet, having a first packet size;
    (d) receiving said at least one packet at said receiving host; and
    (e) said receiving host utilizing a public key of said originating host to verify said cryptographic signature.

5. The method recited in claim 4 wherein said packets are authenticated at an intermediate router by utilizing a public key of said originating host to verify said cryptographic signature.

6. The method recited in claim 4 wherein an asymmetric algorithm is used to generate said cryptographic signature.

7. The method recited in claim 6 wherein said asymmetric algorithm is an RSA digital signature algorithm.

8. A method for authentication of an originating host at a receiving host site and one or more intermediate routers, said method comprising the steps of:
    (a) obtaining a network address for said receiving host;
    (b) utilizing a private key from said originating host to generate a cryptographic signature;
    (c) transmitting said cryptographic signature along with data through two or more subnetworks in at least one packet having a first packet size, where the packet is fragmented into 2 or more packet fragments during transit from said originating host to said receiving host;
    (d) receiving said at least one packet at said receiving host; and
    (e) said receiving host utilizing a public key of said originating host to verify said cryptographic signature.

9. The method recited in claim 8 wherein said transmitting step is conducted by transmitting a first fragmented packet of said first subnetwork packets to a first available intermediate router, and each subsequent fragmented packet of said first subnetwork packets following the progress of said first fragmented packet through said second subnetwork in a train like fashion.

10. The method recited in claim 4, wherein said at least one packet having a first packet size is fragmented and thereby forming at least two fragmented packet, said fragmented packets having a first fragmented packet which is transmitted to a first available intermediate router in said first subnetwork, and each subsequent fragmented packet following the progress of said first fragmented packet through said first subnetwork in a train like fashion.

11. The method recited in claim 9 wherein said packet fragments are authenticated at an intermediate router by first assembling said packet fragments and then utilizing a public key of said originating host to verify said cryptographic signature.

12. The method recited in claim 10 wherein said packet fragments are authenticated at an intermediate router by first assembling said packet fragments and then utilizing a public key of said originating host to verify said cryptographic signature.

13. The method recited in claim 1 wherein said receiving host, utilizing a public key of said originating host, verifies that said data has been sent by said sending host by utilizing said cryptographic signature.

14. The method recited in claim 4 wherein said receiving host, utilizing a public key of said originating host, verifies that said data has been sent by said originating host by utilizing said cryptographic signature.

* * * * *

(12) EX PARTE REEXAMINATION CERTIFICATE (10731st)
United States Patent
Atkinson (10) Number: US 5,511,122 C1
(45) Certificate Issued: Oct. 8, 2015

(54) INTERMEDIATE NETWORK AUTHENTICATION

(75) Inventor: Randall Atkinson, Annandale, VA (US)

(73) Assignee: THE UNITED STATES OF AMERICA, AS REPRESENTED BY THE SECRETARY OF THE NAVY, Washington, DC (US)

Reexamination Request:
No. 90/012,580, Sep. 14, 2012

Reexamination Certificate for:
Patent No.: 5,511,122
Issued: Apr. 23, 1996
Appl. No.: 08/254,087
Filed: Jun. 3, 1994

(51) Int. Cl.
*H04L 29/06* (2006.01)
(52) U.S. Cl.
CPC .............. *H04L 63/126* (2013.01); *H04L 29/06* (2013.01)

(58) Field of Classification Search
None
See application file for complete search history.

(56) References Cited

To view the complete listing of prior art documents cited during the proceeding for Reexamination Control Number 90/012,580, please refer to the USPTO's public Patent Application Information Retrieval (PAIR) system under the Display References tab.

*Primary Examiner* — Jalatee Worjloh (57) ABSTRACT

An internetwork authentication method is provided for verifying a sending host by a receiving host or an intermediate router or gateway. The method comprises the steps of: obtaining a network address and a public key of a receiving host; utilizing the public key from the receiving host in combination with a private key of the originating host to generate a cryptographic signature; transmitting the signature along with data through a first subnetwork in at least one packet; receiving at least one packet at the receiving host; and the receiving host utilizing a private key of said receiving host site and a public key of said originating host to verify said cryptographic signature.

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-14 are cancelled.

* * * * *